US011952960B2

(12) United States Patent
Begot et al.

(10) Patent No.: US 11,952,960 B2
(45) Date of Patent: Apr. 9, 2024

(54) BETA-TYPE STIRLING MACHINE

(71) Applicant: UNIVERSITE DE FRANCHE-COMTE, Besançon (FR)

(72) Inventors: Sylvie Begot, Chaux (FR); Steve Djetel-Gothe, Belfort (FR); Hakeem Khirzada, Belfort (FR); François Lanzetta, Belfort (FR); Guillaume Layes, Belfort (FR); Philippe Nika, Evette Salbert (FR)

(73) Assignee: UNIVERSITE DE FRANCHE-COMT, Besançon (FR)

( * ) Notice: Subject to any disclaimer, the term of this patent is extended or adjusted under 35 U.S.C. 154(b) by 226 days.

(21) Appl. No.: 17/415,587

(22) PCT Filed: Dec. 17, 2019

(86) PCT No.: PCT/EP2019/085687
§ 371 (c)(1),
(2) Date: Jun. 17, 2021

(87) PCT Pub. No.: WO2020/127292
PCT Pub. Date: Jun. 25, 2020

(65) Prior Publication Data

US 2022/0065193 A1 Mar. 3, 2022

(30) Foreign Application Priority Data

Dec. 20, 2018 (FR) ...................................... 1873540
Dec. 20, 2018 (FR) ...................................... 1873559

(51) Int. Cl.
*F25B 9/14* (2006.01)
*F02G 1/044* (2006.01)

(52) U.S. Cl.
CPC ................ *F02G 1/044* (2013.01); *F25B 9/14* (2013.01)

(58) Field of Classification Search
CPC .................................. F02G 1/044; F25B 9/14
See application file for complete search history.

(56) References Cited

U.S. PATENT DOCUMENTS 3,717,004 A * 2/1973 O'Neil ...................... F25B 9/14 60/517
4,633,668 A 1/1987 Corey
4,774,808 A 10/1988 Otters

FOREIGN PATENT DOCUMENTS

DE 1084525 B 6/1960
DE 1245217 B 7/1967
DE 4232555 A1 4/1994
(Continued)

OTHER PUBLICATIONS

Akasawa, Stirling engine, 2007, Full Document (Year: 2007).*
(Continued)

*Primary Examiner* — Nael N Babaa
(74) *Attorney, Agent, or Firm* — Greer, Burns & Crain, Ltd

(57) ABSTRACT

A beta-type Stirling machine capable of operating in a refrigeration mode. The Stirling machine has a cold section and a hot section, a displacement piston having a friction zone, and an engine piston having a friction zone. The Stirling machine has a single liner arranged in the hot section of the Stirling machine operating in the refrigeration mode, wherein the friction zones of the displacement piston and the engine piston slide within the single liner.

15 Claims, 3 Drawing Sheets

(56) References Cited

FOREIGN PATENT DOCUMENTS

| | | | | |
|---|---|---|---|---|
| FR | 1136246 | A | | 5/1957 |
| JP | 2007224855 | A | * | 9/2007 |
| JP | 2007263521 | A | | 10/2007 |
| JP | 2009293406 | A | | 12/2009 |

OTHER PUBLICATIONS

French Search Report received for Application No. 1873540, dated Nov. 4, 2019.
International Search Report and Written Opinion received for PCT/EP2019/085687, dated Mar. 10, 2020.
Werdich, M., et al., "Stirling-Maschinen," Ökobuch; 7., überarb. edition,Jan. 1, 1991, pp. 64-69. (English Summary).

* cited by examiner

BETA-TYPE STIRLING MACHINE

BACKGROUND

The present invention relates to the field of machines with external heat input. In particular, these machines can be used in motor mode or in receiving mode in a refrigerating mode operation or in a heat pump mode operation.

The invention relates in particular to beta-type Stirling machines.

Beta-type Stirling motors, refrigerating machines and heat pumps are known in the state of the prior art. Studies are known in the state of the art aiming to improve sealing between the compression zone and the expansion zone of the Stirling machine. On the other hand, few conclusive studies are known concerning the minimization of direct heat conduction between the cold source and the hot source of the Stirling machine. In fact, the principal developments made to the Stirling machines of the state of the art concern sealing.

In particular, an aim of the invention is to:

- reduce heat exchange by conduction between the hot and cold parts of the Stirling machine, and/or
- reduce the dead spaces present in the Stirling machine, and/or
- reduce the friction losses during the flow of the working gas in the Stirling machine,
- improve the cooling in the friction zones of the Stirling machine.

SUMMARY

To this end, a beta-type Stirling machine is proposed capable of operating in motor mode or in heat pump mode or in refrigerating mode, said Stirling machine comprising:

- a cold part and a hot part,
- a displacer piston comprising a friction zone,
- a power piston comprising a friction zone.

The Stirling machine comprises a single liner positioned in the cold part of the Stirling machine operating in motor mode or in heat pump mode, or respectively in the hot part of the Stirling machine operating in refrigerating mode, in which the friction zones of the displacer piston and of the power piston slide.

In the present application, the term “Stirling machine” denotes a beta-type Stirling machine capable of operating equally well in motor mode and in receiving mode (i.e. in refrigerating machine or heat pump operation).

In the present application, when no mode of operation of the Stirling machine (motor mode or refrigerating mode or heat pump mode) is specified, operation in motor mode is considered as the default mode of operation. In this case, it is understood that the described characteristic of the Stirling machine corresponds to operation in motor mode. Consequently, a part or an element in question of the Stirling machine, operating in motor mode, which performs a function different from a function performed by the same part, or the same element in question, of the Stirling machine operating in another mode, can be substituted by the function of the part or of the element in question corresponding to the other mode of operation of the Stirling machine, by making the changes specified below.

Referring to the Cold and Hot Parts of the Stirling Machine.

When the Stirling machine operates in motor mode, the part situated on the side of a crankcase of the Stirling machine is the cold part and the part situated on the side of the Stirling machine opposite to the crankcase is the hot part. The cold part of the Stirling machine operating in motor mode corresponds to the cold part of the Stirling machine operating in heat pump mode and corresponds to the hot part of the Stirling machine operating in refrigerating mode. Similarly, the hot part of the Stirling machine operating in motor mode corresponds to the hot part of the Stirling machine operating in heat pump mode and corresponds to the cold part of the Stirling machine operating in refrigerating mode.

Referring to the Compression and Expansion Zones of the Stirling Machine.

When the Stirling machine operates in motor mode, the part situated on the side of a crankcase of the Stirling machine is the compression zone and the part situated on the side of the Stirling machine opposite to the crankcase is the expansion zone. The compression zone of the Stirling machine operating in motor mode corresponds to the compression zone of the Stirling machine operating in refrigerating mode and corresponds to the expansion zone of the Stirling machine operating in heat pump mode. Similarly, the expansion zone of the Stirling machine operating in motor mode corresponds to the expansion zone of the Stirling machine operating in refrigerating mode and corresponds to the compression zone of the Stirling machine operating in heat pump mode.

Referring to the Element of the Stirling Machine Defined as the Heater, or Respectively the Cooler, of the Stirling Machine.

The element of the Stirling machine in which a gas travels, moving from the passage ducts of the single liner to the compression space volume of the Stirling machine operating in motor mode or in refrigerating mode, or vice versa, is a cooler. The element of the Stirling machine in which a gas travels, moving from the passage ducts of the single liner to the expansion space volume of the Stirling machine operating in heat pump mode, or vice versa, is a heater.

Referring to the Part of the Stirling Machine Situated on the Side Opposite to the Crankcase, Which Can be Defined as the Heat exchanger of the Stirling Machine.

The part of the Stirling machine situated on the side opposite to the crankcase is the hot heat exchanger of the Stirling machine operating in motor mode or in heat pump mode, or respectively is the cold heat exchanger of the Stirling machine operating in refrigerating mode.

The single liner can be a dry liner.

The single liner can be constituted by a single piece.

The single liner can be produced integrally and/or from one and the same material.

The single liner can be positioned entirely in the cold part of the Stirling machine.

The single liner can form a part of a cylinder of the Stirling machine located in the cold part of the Stirling machine.

The single liner can extend along the stroke of the friction zones of the displacer piston and of the power piston.

By friction zones of the displacer piston and of the power piston is meant the friction zone of the displacer piston with the single liner and the friction zone of the power piston with the single liner.

A frictionless zone of the single liner can be situated between the friction zone of the displacer piston with the single liner and the friction zone of the power piston with the single liner.

The single liner can extend only along the stroke of the friction zones of the displacer piston and of the power piston.

The liner can extend beyond the stroke of the displacer piston and/or of the power piston in the friction zones.

The single liner can extend from a lower end-of-stroke of the power piston in the friction zone, called crankcase end of the single liner, said lower end-of-stroke of the power piston in the friction zone being situated on the side of a crankshaft of the power piston, up to an upper end-of-stroke of the displacer piston in the friction zone, called separation end of the single liner, said upper end-of-stroke of the friction zone of the displacer piston being situated on the side of a heat exchanger.

The hot heat exchanger can be situated on the side of an expansion zone of the Stirling machine operating in motor mode or in refrigerating mode, or respectively on the side of a compression zone of the Stirling machine operating in heat pump mode.

The heat exchanger can be a hot heat exchanger when the Stirling machine is operating in motor mode or in heat pump mode, or respectively a cold heat exchanger when the Stirling machine is operating in refrigerating mode.

The single liner can extend from a lower end-of-stroke of a terminal part of the power piston, called crankcase end of the single liner, said lower end-of-stroke of the terminal part of the power piston being situated on the side of the crankshaft of the power piston. The upper end-of-stroke of a terminal part of the displacer piston situated on the side of the hot heat exchanger is preferably situated in the hot heat exchanger.

Preferably, the hot heat exchanger forms a terminal part of the hot part of the Stirling machine. Preferably, the hot heat exchanger forms a terminal part of the cylinder.

The single liner can comprise passage ducts of a gas moving from a compression space volume of the Stirling machine operating in motor mode or in refrigerating mode, or respectively an expansion space volume of the Stirling machine operating in heat pump mode, to a cooler of the Stirling machine operating in motor mode or in refrigerating mode, or respectively a heater of the Stirling machine operating in heat pump mode, or vice versa, said passage ducts passing through the single liner. The passage ducts can be extended according to the thickness of the single liner.

The compression space volume is situated between the displacer piston and the power piston. When the power piston is at the upper end-of-stroke, the displacer piston is in mid-stroke. There is an angle of the cycle where the compression space volume is minimal.

Preferably, the passage ducts can be situated in a zone of the liner, called compression zone, situated between the upper end-of-stroke of the power piston and the lower end-of-stroke of the displacer piston.

Preferably, the passage ducts can be distributed in annular fashion in the compression zone.

Preferably, said passage ducts passing through the single liner are situated at the level of a frictionless zone of the single liner.

The cooler of the Stirling machine operating in motor mode or in refrigerating mode, or respectively the heater of the Stirling machine operating in heat pump mode can be, at least partially, preferably entirely, in direct contact with the single liner and can surround, at least partially, preferably entirely, the single liner, said cooler of the Stirling machine operating in motor mode or in refrigerating mode, or respectively the heater of the Stirling machine operating in heat pump mode, being entirely comprised within the cold part of the Stirling machine operating in motor mode or in heat pump mode, or respectively in the hot part of the Stirling machine operating in refrigerating mode.

The cooler can be arranged to convey a gas from the passage ducts of the single liner in the direction of the hot part of the Stirling machine, or vice versa, and to cool the gas in question while it passes through the cooler.

The term "gas" may denote a mixture of gases.

The cooler can be arranged to convey a gas from the passage ducts of the single liner to a regenerator of the Stirling machine, or vice versa, and to cool the gas in question while it passes through the cooler.

An inner wall of the cooler can be, at least partially, preferably entirely, in direct contact with the single liner and can surround, at least partially, preferably entirely, the single liner, said cooler being entirely comprised within the cold part of the Stirling machine. The inner wall of the cooler is situated on the side of the single liner.

The cooler can comprise one or more gas flow routes. Preferably, the cooler comprises a plurality of gas flow routes.

The one or more flow route or routes of the cooler can be partially delimited by the inner wall of the cooler.

The one or more flow routes of the cooler can be, at least partially, preferably entirely, in direct contact with the single liner and can surround, at least partially, preferably entirely, the single liner, said cooler being entirely comprised within the cold part of the Stirling machine. The flow route, or flow routes, of the cooler can be partially delimited by an outer wall, or respectively parts of the outer wall, of the single liner. The outer wall of the single liner is situated on the side of the cooler.

The cooler can be in direct contact with the single liner and can extend from the passage ducts in the direction of the hot part.

The cooler can be in direct contact with the single liner and can extend from the passage ducts to a separation end of the liner with the hot part.

The cooler can surround the single liner on a zone extending from the separation end of the liner with the hot part to the passage ducts of the single liner.

The single liner and the cooler of the Stirling machine operating in motor mode or in refrigerating mode, or respectively the heater of the Stirling machine operating in heat pump mode can be inserted at least partially, preferably entirely, into a crankcase until being brought into abutment against shoulders of the crankcase.

The crankcase can comprise, among others, the connecting rods of the power and displacer pistons, and the crankshaft.

The crankcase can comprise a single shoulder or shoulders for the single liner and a single shoulder or shoulders for the cooler. The single shoulder or the shoulders for the cooler can be different from the single shoulder or the shoulders for the single liner.

The Stirling machine can comprise a head forming at least partially, preferably entirely, the hot part of the Stirling machine operating in motor mode or in heat pump mode, or respectively the cold part of the Stirling machine operating in refrigerating mode; at least a part of one end of said head, called separation end of the head, preferably the entirety of the separation end of said head, is partially in abutment on the separation end of the single liner and partially in abutment on a part of the cooler of the Stirling machine operating in motor mode or in refrigerating mode, or respectively on a part of the heater of the Stirling machine operating in heat pump mode, called separation end of the cooler of the Stirling machine operating in motor mode or in refrigerating machine mode, or respectively called separation end of the heater of the Stirling machine operating in heat pump mode.

The term “in abutment” can denote a direct contact.

The part of the head in abutment on the separation end of the single liner and the part of the head in abutment on the separation end of the cooler can form the entirety of the separation end of said head.

Preferably, no friction occurs between the displacer piston and the head.

The head can constitute partially, preferably entirely, the hot part of the Stirling machine.

Preferably, the head forms a part of the cylinder positioned in the hot part of the Stirling machine.

Preferably, the head comprises a hot heat exchanger. The hot heat exchanger can form a part of the head.

Preferably, a terminal part of the head forms at least partially, preferably entirely, the hot heat exchanger.

The Stirling machine can comprise a regenerator extending from the separation end of the head to one or more terminal parts, called regenerator terminal parts, of one or more passage channels of the gas moving from the expansion space volume of the Stirling machine operating in motor mode or in refrigerating mode, or respectively from the compression space volume of the Stirling machine operating in heat pump mode, to the regenerator, or vice versa.

The passage channel or channels can be provided in a wall of the head separating the cylinder from the outside of the Stirling machine.

The regenerator can be gripped between two walls of the head, one of said walls, called inner wall of the regenerator, forming a part of an inner wall of the hot part of the Stirling machine operating in motor mode or in heat pump mode, or respectively of the cold part of the Stirling machine operating in refrigerating mode, the other one of said walls, called outer wall of the regenerator, forming a part of an outer wall of the hot part of the Stirling machine operating in motor mode or in heat pump mode, or respectively of the cold part of the Stirling machine operating in refrigerating mode.

The passage channel or channels can be comprised between a part of the inner wall of the hot part of the Stirling machine, called inner wall of the passage channel or channels, and another wall of the hot part of the Stirling machine, called outer wall of the passage channel or channels.

The inner wall of the regenerator can constitute a prolongation of the inner wall of the passage channel or channels. The outer wall of the regenerator can constitute a prolongation of the outer wall of the passage channel or channels.

A prolongation of the outer wall of the regenerator can form a part of the inner wall of the hot part of the Stirling machine. A prolongation of the outer wall of the regenerator can form a part of the inner wall of the hot heat exchanger.

An inner wall of the part of the cylinder formed by the head can constitute the inner wall of the hot part of the Stirling machine.

A part of the outer wall of the regenerator can be in abutment on the separation end of the cooler of the Stirling machine operating in motor mode or in refrigerating mode, or respectively the heater of the Stirling machine operating in heat pump mode, and a part of the inner wall of the regenerator is in abutment on the separation end of the single liner. In this case, the part of the separation end of the head in abutment on the separation end of the single liner constitutes the part of the inner wall of the regenerator in abutment on the separation end of the single liner. In this case, also, the part of the separation end of the head in abutment on the separation end of the cooler of the Stirling machine operating in motor mode or in refrigerating mode, or respectively the heater of the Stirling machine operating in heat pump mode, constitutes the part of the outer wall of the regenerator in abutment on the separation end of the cooler of the Stirling machine operating in motor mode or in refrigerating mode, or respectively the heater of the Stirling machine operating in heat pump mode. In this case, also, the part of the outer wall of the regenerator and the part of the inner wall of the regenerator constitute the separation end of the head.

The Stirling machine can comprise one or more recesses. The one or more recesses can be produced in:

- one or more parts of the separation end of the single liner in abutment on the separation end of the head and/or one or more parts of the separation end of the cooler of the Stirling machine operating in motor mode or in refrigerating mode, or respectively the heater of the Stirling machine operating in heat pump mode, in abutment on the separation end of the head, and/or
- one or more parts of the separation end of the head in abutment on the separation end of the single liner and/or in abutment on the separation end of the cooler of the Stirling machine operating in motor mode or in refrigerating mode, or respectively the heater of the Stirling machine operating in heat pump mode.

Preferably, the recess or recesses are arranged to minimize the surfaces of contact between the hot part and the cold part of the Stirling machine so as to limit the heat conduction between these parts.

Preferably, the contact zones between the hot part and the cold part of the Stirling machine, among others between the regenerator and the head and between the single liner and the head, can be arranged to minimize the surfaces of contact between the hot part and the cold part of the Stirling machine so as to limit the heat conduction between these parts.

The Stirling machine can comprise an assembly system arranged to keep the head and the crankcase in contact; the assembly system is connected to the crankcase and is arranged to engage with a shoulder of the head situated at the level of the separation end of the outer wall of the head being in abutment on the separation end of the cooler of the Stirling machine operating in motor mode or in refrigerating mode, or respectively the heater of the Stirling machine operating in heat pump mode.

The assembly system can be a fastening system of the clamp type.

A part of the assembly system arranged to engage with the shoulder of the head can be a shoulder of the clamp.

Preferably, the assembly system is engaged with the shoulder only. The assembly system can be in abutment on an outer wall of the crankcase.

The shoulder can be a part of the outer wall of the head and/or a part of the cooler.

Preferably, the contact zones between the assembly system and the other elements of the Stirling machine, among others the crankcase and the head, can be arranged to minimize the surfaces of contact between the hot part and the cold part of the Stirling machine so as to limit the heat conduction between these parts.

A maximum hydraulic diameter of each of the flow routes of the cooler of the Stirling machine operating in motor mode or in refrigerating mode, or respectively of the heater of the Stirling machine operating in heat pump mode, and of the passage channels of the head can be greater than or equal to a thickness of a thermal boundary layer.

Preferably, a maximum hydraulic diameter of each of the flow routes of the cooler and of the passage channels of the head can be greater than or equal to twice a thickness of the thermal boundary layer. More preferably, a maximum hydraulic diameter of each of the flow routes of the cooler and of the passage channels of the head can be equal to three times a thickness of the thermal boundary layer.

This characteristic has the effect of restricting the flows according to desired dynamics, while limiting the dead space constituted by the cooler.

Preferably, a length of each of the passage ducts in a direction of stroke of the displacer and power pistons, called thickness of the passage ducts, is the smallest length of the passage ducts.

The Stirling machine can comprise one or more friction means of the displacer piston and/or one or more friction means of the power piston with the single liner. The one or more friction means of the displacer piston and/or one or more friction means of the power piston can comprise graphite and/or polytetrafluoroethylene (PTFE).

The friction means can be a segment.

The friction zone of a piston can be defined as the zone in which extend one or more friction means of the piston in question.

A friction zone of the liner can be defined as the zone of the liner with which the one or more friction means of a piston or pistons is(are) in contact.

When a piston comprises several friction means, the lower end-of-stroke of the power piston in the friction zone can correspond to the end of a friction means situated on the side of the crankshaft of the power piston, and the upper end-of-stroke of the friction zone of the displacer piston can correspond to the end of the friction means of the displacer piston situated on the side of the heat exchanger.

The single liner of the Stirling machine can be made from steel.

BRIEF DESCRIPTION OF THE DRAWINGS

Other advantages and characteristics of the invention will become apparent on reading the detailed description of implementations and embodiments that are in no way limitative, and from the following attached drawings.

DETAILED DESCRIPTION

Figure 1:
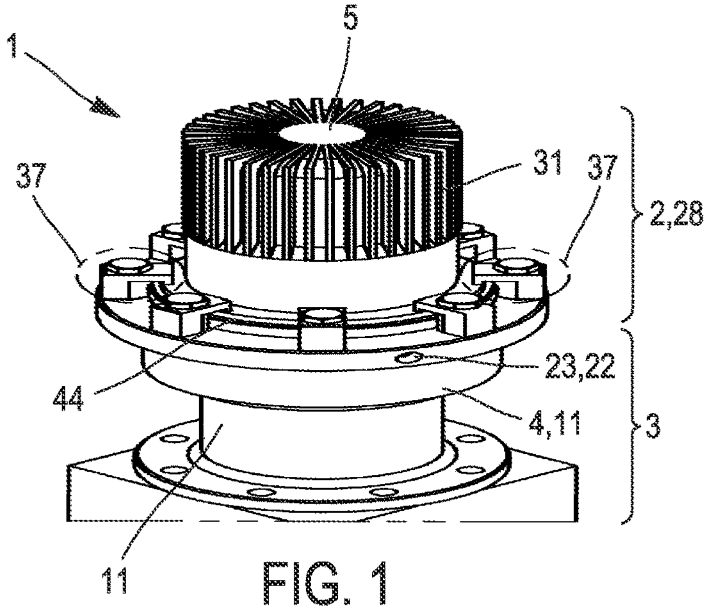
FIG. 1 is a diagrammatic representation in an oblique view of a beta-type Stirling engine according to the invention.

As the embodiments described hereinafter are in no way limitative, it is possible in particular to consider variants of the invention comprising only a selection of the characteristics described, in isolation from the other characteristics described (even if this selection is isolated within a sentence comprising these other characteristics), if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

For the sake of clarity and to make the description as easy as possible to understand, the described embodiments described below are of a beta-type Stirling machine 1 operating in motor mode. However, the characteristic described for the operation of the Stirling machine 1 operating in motor mode can be substituted by the characteristic corresponding to another mode of operation of the Stirling machine 1 by making the changes as described in the disclosure part of the present application. It should therefore be remembered that the beta-type Stirling machine 1 operating in motor mode as described below can operate equally well in receiving mode, i.e. in refrigerating machine or heat pump mode operation. Consequently, the part or the element in question of the Stirling machine 1 operating in motor mode that performs a function different from the function performed by the same part, or the same element, in question of the Stirling machine 1 operating in another mode, can be substituted by the function corresponding to the other mode of operation of the Stirling machine 1 by making the changes specified below. To this end, it is sufficient to substitute the function of the part, or of the element, pertaining to operation in motor mode with the function of the corresponding part, or of the element, pertaining to the intended mode of operation.

The main substitutions to be carried out concern the following characteristics:

- when the Stirling machine 1 operates in motor mode, the part situated on the side of the crankcase 11 is the cold part 3 and the part situated on the side of the Stirling machine 1 opposite to the crankcase is the hot part 2. The cold part 3 of the Stirling machine 1 operating in motor mode corresponds to the cold part 3 of the Stirling machine 1 operating in heat pump mode and corresponds to the hot part 3 of the Stirling machine 1 operating in refrigerating mode. Similarly, the hot part 2 of the Stirling machine 1 operating in motor mode corresponds to the hot part 2 of the Stirling machine 1 operating in heat pump mode and corresponds to the cold part 2 of the Stirling machine 1 operating in refrigerating mode,
- when the Stirling machine 1 operates in motor mode, the part situated on the side of the crankcase 11 of the Stirling machine 1 is the compression zone 3 and the part situated on the side of the Stirling machine 1 opposite to the crankcase is the expansion zone 2. The compression zone 3 of the Stirling machine 1 operating in motor mode corresponds to the compression zone 3 of the Stirling machine 1 operating in refrigerating mode and corresponds to the expansion zone 3 of the Stirling machine 1 operating in heat pump mode. Similarly, the expansion zone 2 of the Stirling machine 1 operating in motor mode corresponds to the expansion zone 2 of the Stirling machine 1 operating in refrigerating mode and corresponds to the compression zone 2 of the Stirling machine 1 operating in heat pump mode, the element of the Stirling machine 1 in which a gas travels, moving from the passage ducts 13 of the single liner 8 to the compression space volume 14 of the Stirling machine 1 operating in motor mode or in refrigerating mode, or vice versa, is a cooler 4. The element of the Stirling machine 1 in which a gas travels, moving from the passage ducts 13 of the single liner 8 to the expansion space volume 14 of the Stirling machine 1 operating in heat pump mode, or vice versa, is a heater 4, referring to the part of the Stirling machine 1 situated on the side opposite to the crankcase 11, which can be defined as the heat exchanger 5 of the Stirling machine 1. The part of the Stirling machine situated on the side opposite to the crankcase 11 is the hot heat exchanger 5 of the Stirling machine 1 operating in motor mode or in heat pump mode, or respectively is the cold heat exchanger 5 of the Stirling machine 1 operating in refrigerating mode.

Figure 2:
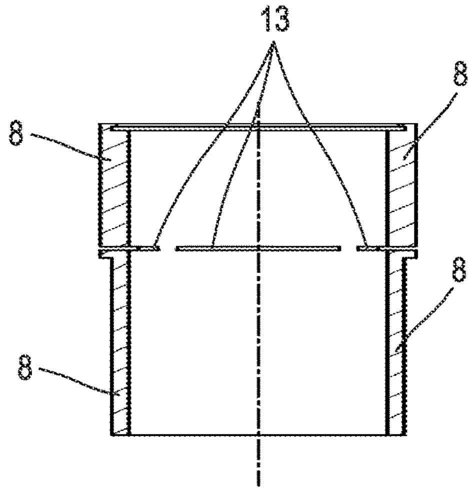
FIG. 2 is a diagrammatic representation in cross section of the single liner of the beta-type Stirling engine according to the invention.
Figure 3:
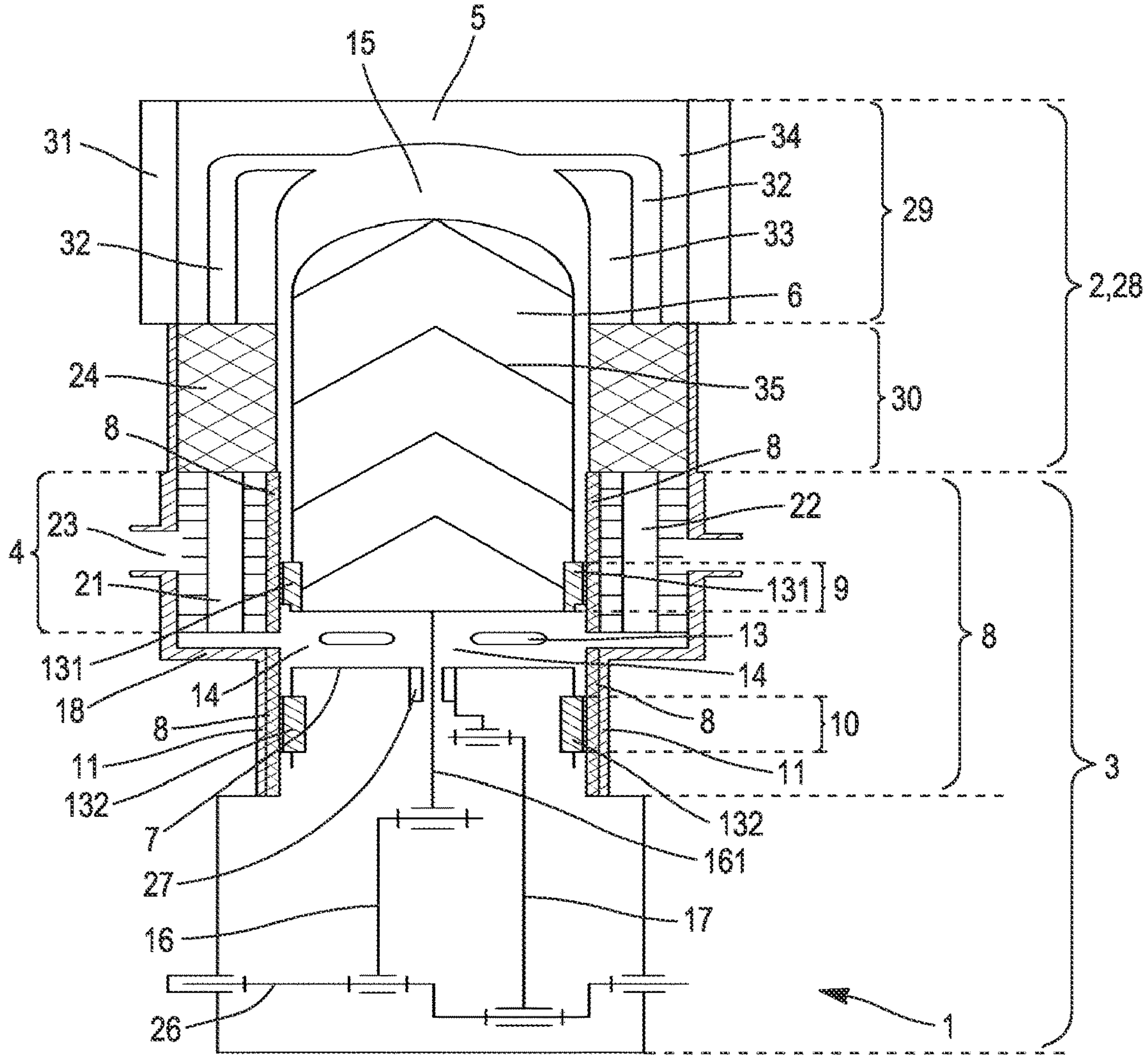
FIG. 3 is a diagrammatic representation of a cross section of a beta-type Stirling engine according to the invention.
Figure 4:
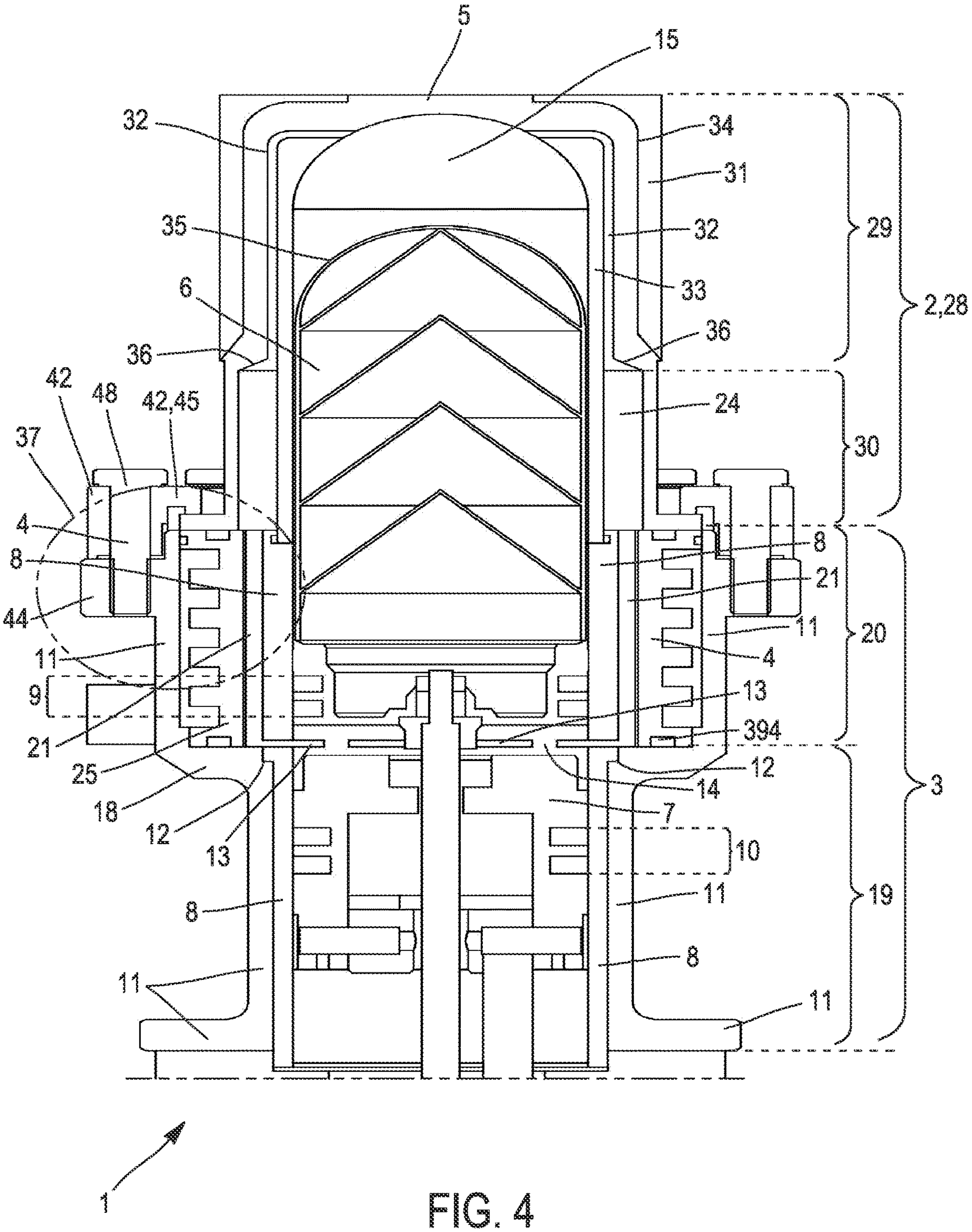
FIG. 4 is a diagrammatic representation of a cross section view of a beta-type Stirling engine according to the invention.
Figure 5:
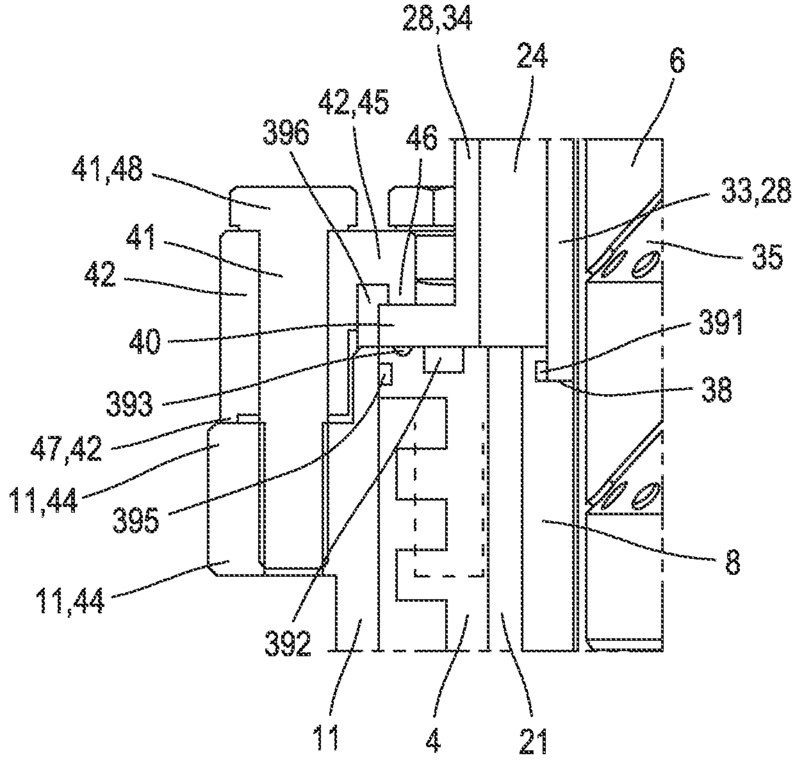
FIG. 5 is a diagrammatic representation of a cross section view of the assembly system of the hot and cold parts of the beta-type Stirling machine according to the invention.
Figure 6:
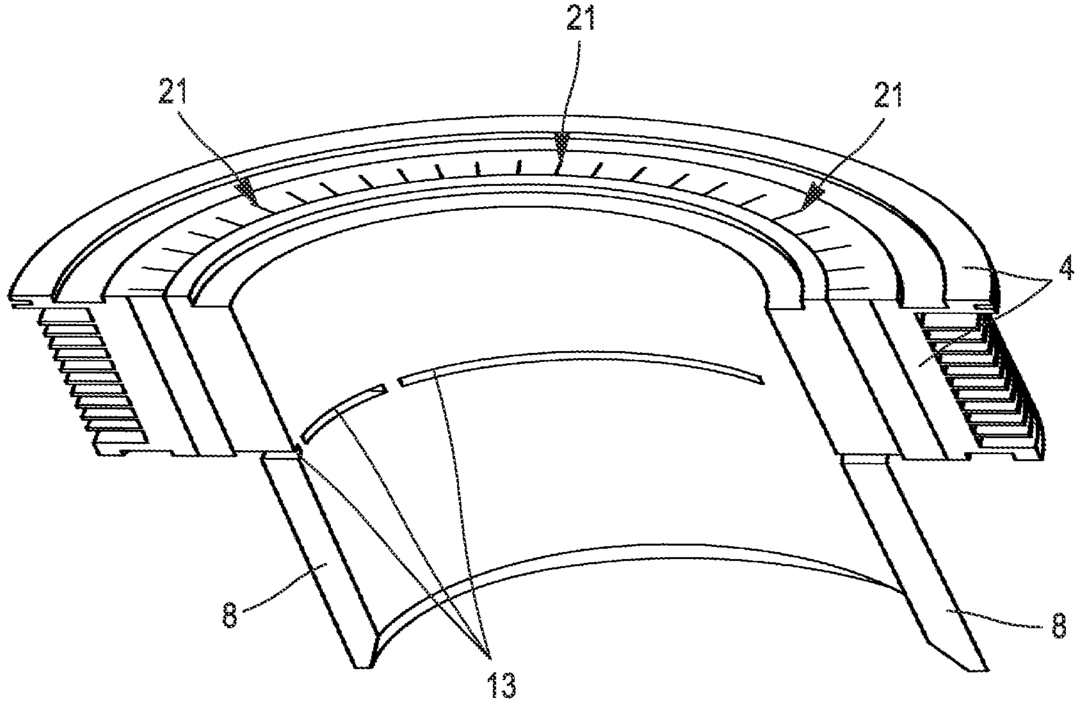
FIG. 6 is a diagrammatic representation in an oblique view of a vertical section of a zone of the beta-type Stirling engine according to the invention comprising the single liner and the cooler of the Stirling engine.

With reference to FIGS. 1 to 6, a beta-type Stirling engine 1 is described in a first embodiment. The Stirling engine 1 comprises a cold part 3 and a hot part 2. The Stirling engine 1 comprises a hot heat exchanger 5 and a cooler 4. The Stirling engine 1 comprises a displacer piston 6 and a power piston 7. The displacer piston 6 comprises an assembly 131 formed by a sealing segment and by a guide ring of the displacer piston 6. The power piston 7 comprises an assembly 132 formed by a sealing segment and by a guide ring of the power piston 7. The beta-type Stirling engine 1 according to the invention comprises a single liner 8 positioned entirely within the cold part 3 of the engine 1 in which slide the friction zone 9 of the displacer piston 6 and the friction zone 10 of the power piston 7.

In the remainder of the present description, the term "motor" used alone denotes a beta-type Stirling machine 1 operating in motor mode.

By way of non-limitative example, the operating conditions for which the motor 1 was designed are 900° C. for the temperature at the level of the hot heat exchanger 5, pressures of the working gas of the order of 100 bar, and an operating frequency of 50 Hz for operation in motor mode. When use of the Stirling machine 1 in refrigerating mode is envisaged, the temperature at the level of the cold heat exchanger 5 is of the order of −50° C., working gas pressures are of the order of 100 bar and the operating frequency is of the order of 50 Hz. Finally, for use in heat pump mode, the temperature at the level of the hot heat exchanger 5 is 200° C., working gas pressures are of the order of 100 bar and the operating frequency is of the order of 50 Hz. The machine 1 is designed to operate without lubrication.

Firstly, the cold part 3 of the motor 1 will be described.

The power piston 7 and the displacer piston 6 are connected to the crankshaft 26 by means of the respective connecting rods 16, 17. The shaft 161 of the connecting rod 16 passes through the power piston 7 at the level of a sliding bush 27 providing the sealing and the sliding of the shaft in question through the power piston 7. The displacer piston 6 comprises anti-radiation screens 35.

The single liner 8 constitutes the part of the cylinder of the motor 1 situated in the cold part 3 of the motor 1. Use of a single liner 8 makes it possible to avoid introducing a junction zone, present when two liners are used. This facilitates maintenance and cost-effectiveness, and avoids introducing a high thermal gradient which necessarily appears at the level of the junction when two liners are used. Furthermore, no dead space is created at the junction.

The single liner 8 comprises passage ducts 13 of the working gas through the liner 8. The passage ducts 13 pass through the liner 8 in a radial direction with respect to the strokes of the pistons 6, 7. The passage ducts 13 are distributed in annular fashion along the compression zone 14 of the gases.

The passage ducts 13 have an elongated shape. The length of the passage ducts 13 along the inner perimeter of the liner 8 is greater than the thickness of the passage ducts 13 in the direction of stroke of the pistons 6, 7. The thickness of the passage ducts 13 is minimized in order to reduce the volume situated at the level of the compression space volume 14. The shape of the passage ducts 13 according to the invention thus makes it possible to improve the efficiency of the motor 1 by reducing the distance separating the ends-of-stroke of the displacer 6 and power 7 pistons at the level of the compression space volume 14, and consequently reducing the dead space constituted by the distance separating the ends-of-stroke of the displacer 6 and motor 7 pistons at the level of the compression space volume 14.

The size of the passage ducts 13 governs the friction losses. Too small a size restricts the flow of gases between the compression space volume 14 and the expansion space volume 15 and reduces the efficiency of the motor 1. In practice, the thickness of the passage ducts 13 is limited by the mechanical strength of the liner.

The single liner 8 is inserted into the crankcase 11 and abuts against a shoulder 12 provided in the inner wall of the crankcase 11. After the single liner 8 has been inserted into the crankcase 11, the part of the outer wall of the liner 8 extending from the lower end of the passage ducts 13 to the end-of-stroke of the friction zone 10 of the power piston 7 on the side of the connecting rods 16, 17 is in direct contact with the inner wall of the crankcase 11. The portion of the cold part 3 of the motor 1 comprising the part of the outer wall of the liner 8 in question is called lower part 19. The end of the single liner 8 situated on the side of the connecting rods 16, 17 can extend beyond the end-of-stroke of the power piston 7 on the side of the connecting rods 16, 17.

After the single liner 8 has been inserted, the part of the outer wall of the liner 8 extending from the lower end of the passage ducts 13 to the end-of-stroke of the friction zone 9 of the displacer piston 6 situated on the side of the hot heat exchanger 5 is not in contact with the inner wall of the crankcase 11. The portion of the cold part 3 of the motor 1 comprising the part of the outer wall of the liner 8 in question is called upper part 20. At the level of the lower end of the passage ducts 13, the crankcase 11 forms a shoulder 18 which, in the upper part 20 of the cold part 3, distances the inner wall of the crankcase 11 from the outer wall of the liner 8.

After the single liner 8 has been inserted, a housing is thus formed between the wall of the crankcase 11 and the wall of the single liner 8 in the upper part 20 of the cold part 3 of the motor 1. This housing is arranged to accommodate the cooler 4. The cooler 4 can be inserted into the housing or formed integrally with the crankcase 11. An input 22 and an output 23 are provided through the crankcase 11 to allow the heat transfer fluid, for example water, to flow in the cooler 4.

In this configuration, the single liner 8 is in direct contact with the cooler 4. This ensures better cooling of the liner 8 and therefore of the compression zone 14. In addition, this arrangement ensures direct contact of the single liner 8 with the whole of the wall of the cooler 4 over the whole length of the cooler 4. This aspect ensures better heat transfer between these parts. Use of a single liner 8 entirely situated in the compression zone 14 makes it possible to keep the liner 8 at low temperatures and thus to significantly reduce the thickness of the wall of the single liner 8. This configuration makes it possible to keep a temperature of the single liner 8 at a temperature below 60° C. The fact that the thickness of the liner 8 is small considerably reduces the heat conduction between the hot 2 and cold 3 parts, which are at different temperatures. The fact that the temperature of the single liner 8 is low reduces the thermal expansion of the liner.

The fact that the friction zones 9, 10 are only in contact with the single liner 8 and that the liner 8 remains at such low temperatures makes it possible to use segment/single liner pairs based on materials not usually employed. By way of non-limitative example, the liner can be made from steel, for example 42CD4T grade steel, and the segments produced from PTFE/graphite composite. The PTFE/graphite pair is used as a solid lubricant, which makes it possible to dispense with the heat treatment steps of the steel.

The cooler 4 comprises flow routes 21 of the working gas. These flow routes 21 extend along the cooler 4 in the direction of stroke of the pistons 6, 7 and connect the passage ducts 13 to a regenerator 24 situated in the hot part 2 of the motor 1.

The cooler 4 is inserted into the housing and abuts against the shoulders 25 and 18 of the crankcase 11. The shoulder 25 is provided in the wall of the crankcase 11. The wall of the cooler 4 in contact with the shoulder 18 comprises a recess 394 intended to accommodate a sealing element between the water and the working gas. The side wall of the cooler 4 in contact with the wall of the crankcase 11 of the upper part 20 of the motor 1 contains a recess 395 also intended to accommodate a sealing element between the water and the outside. The cooler 4 is arranged so that after having been inserted in the housing, its wall situated on the side of the liner 8 is passed through by flow routes 21. Thus, these flow routes 21 connect the passage ducts 13 to a regenerator 24 situated in the hot part 2 of the motor 1.

Secondly, the hot part 2 of the motor 1 will be described.

The hot part 2 is composed of a head 28 made from steel or Inconel. The head 28 constitutes the hot part 2 of the motor 1. According to the invention, the friction zones 9, 10 are only in contact with the single liner 8, the head 28 is not subject to any mechanical stress associated with friction. The thickness of the head 28 is thus also reduced so as to minimize the contact zones between the head 28 and the cold part 3, and consequently further limit the heat conduction between the hot 2 and cold 3 parts of the motor 1 that are not at the same temperature. Provision is made in the head 28 for the part of the cylinder of the motor 1 situated in the hot part 2. The terminal part of the head 28 comprises the hot heat exchanger 5. The expansion space volume 15 situated in the terminal part of the cylinder is in contact with the hot heat exchanger 5. A portion 29, called upper portion, of the head 28 extends from the hot heat exchanger 5 to the regenerator 24. A portion 30, called lower portion, of the head 28 comprises the regenerator 24 and extends from the end of the upper portion 29 to the cooler 4. The outer wall of the upper portion 29 of the head 28 comprises fins 31 improving heat exchange in the vicinity of the hot heat exchanger 5.

Passage channels 32 connecting the expansion zone 15 to the regenerator 24 are provided in the upper portion 29 of the head 2. These passage channels 32 are comprised between the inner wall 33 and the outer wall 34 of the head 28. The inner wall 33 of the head 28 also constitutes the wall of the cylinder of the motor 1. The fins 31 extend from the outer wall 34 of the head 28.

A shoulder 36 is provided in the inner surface of the outer wall 34 of the head 28. This shoulder 36 causes an increase in the distance separating the inner wall 33 from the outer wall 34 in the lower portion 30. This increase in the distance thus forms a housing between the walls 33, 34 of the head 28. The shape of the shoulder 36 reduces the friction losses during the flow of the gas between the regenerator 24 and the hot heat exchanger 5. The regenerator 24 can be inserted into the housing or formed integrally with the head 28.

The hot part 2 also comprises a regenerator 24 intended to store then return the heat from the gas travelling from the expansion space volume 15 of the motor mode 1 to the compression space volume 14 of the motor mode 1. The service gas, or working gas, is also cooled or heated while it passes through the regenerator 24. The regenerator 24 extends from the passage channels 32 of the head 28 to the flow routes 21 of the cooler 4 of the motor mode 1.

Preferably, the regenerator 24 can be designed separately so as to meet perfectly the conditions of use of the motor 1. The regenerator 24 can be inserted into the housing of the head 28 until it abuts against the shoulder 36. In order to reduce heat exchange between the cold part 3 and the hot part 2, the length of the regenerator 24 in the direction of stroke of the pistons 6, 7 will be increased. The optimal length will be established to optimize the compromise between minimizing conduction and reducing friction losses and dead space. The regenerator 24 is arranged so that heat storage takes place as far as possible from the cold part 3 on the side of the hot heat exchanger 5.

In order to limit friction losses, it is preferable to use a regenerator 24 comprising volumes with different porosities arranged successively along the direction of flow of the gas. To this end, it is more preferable for alternate portions with high and low porosity to be formed, aiming to increase the overall hydraulic diameter of the regenerator 24 so as to reduce the overall friction losses, while preserving an equivalent exchange surface. Still for the sake of limiting friction losses, it is preferable to use a regenerator 24 of which the porosity values at the ends of the regenerator 24, and in particular on the side of the hot heat exchanger 5, are lower than the porosity values in the centre of the regenerator 24.

The performance of the regenerator 24 is also improved when:

the porosities of the portions of the regenerator 24 increase from a central plane of the regenerator to the ends of the regenerator 24, and/or the portion of the regenerator with the highest porosity has a porosity equal to 1, and/or the porosity is comprised between 0 and 1 per unit of volume and/or between 0 and 1 per unit of length, and/or the regenerator 24 is produced from a rigid porous material being composed of an assembly of contiguous cells arranged spatially relative to one another; the or each of the surfaces of contact of each of the cells with the gas forms (form) an angle comprised between 5° and 85° with respect to the direction of flow of the gases, and/or each cell of the regenerator 24 comprises at least four oblong elements extending from the centre of the cell, each of the elements forming an angle comprised between 5° and 85° with respect to the direction of flow of the gases, and/or two contiguous cells of the regenerator 24 are physically connected together:

by at least one of their oblong elements, or by a layer of material to which at least one of their oblong elements is connected, and/or the oblong elements of the cells of the regenerator 24 are symmetrical in twos with respect to one or more planes of symmetry comprising the centre of the cell.

Thirdly, the assembly of the cold 3 and hot 2 parts and the geometrical characteristics of the motor 1 will be described.

One of the points limiting the efficiency of beta-type Stirling machines arises from the fact that the hot 2 and cold 3 parts are placed next to one another. Therefore, heat exchange by conduction between the hot part 2 and the cold part 3 must be reduced as far as possible. Heat conduction by the parts of the machine remains the main factor reducing the efficiency of the beta-type Stirling machines. Some of the Stirling machines of the state of the art introduce insulation means placed between the cold part 3 and the hot part 2 to thermally insulate the hot part 2 from the cold part 3. This increases the weight and the cost of the Stirling machine 1 and introduces maintenance difficulties and an increase in dead space. According to the invention, no insulation means is inserted between the cold part 2 and the hot part 3 of the Stirling machine 1.

The head 28 is placed in contact with the cold part 3 of the motor 1. When the head 28 is in contact with the cold part 3 of the motor 1, the end of the inner wall 33 of the head 28 is in contact with a shoulder 38 situated at the end of the single liner 8. The side wall of the shoulder 38 contains a recess 391 intended to reduce the surface of contact between the head 28 and the single liner 8 and consequently the heat conduction between the head 28 and the liner 8. This recess 391 also makes it possible to accommodate a sealing element. When the head 28 is in contact with the cold part 3 of the motor 1, a shoulder 40 situated at the end of the outer wall 34 of the head 28 is in contact with the face of the cooler 4 situated opposite the head 28. The face of the cooler 4 opposite the head 28 comprises two recesses 392, 393 intended to reduce the surface of contact between the head 28 and the cooler 4 and consequently the heat conduction between the head 28 and the cooler 4. The recess 392 is arranged to receive a sealing element between the working gas and the outside. When the head 28 is in contact with the cold part 3 of the motor 1, the end face of the regenerator 24 situated opposite the cold part 3 is partially in abutment on the end faces of the cooler 4 and of the single liner 8 situated opposite the end face of the regenerator 24 in question. The end of the flow routes 21 of the cooler 4 situated on the side of the hot part 2 open onto the end face of the regenerator 24 situated opposite.

The cold part 3 is kept in contact with the hot part 2 by means of a system of assembly clamps 37. By way of non-limitative example, the motor 1 comprises eight assembly clamp systems 37. Each system 37 comprises a screw 41 intended to be inserted from an upper side of a clamp 42 and into an opening of the clamp 42. The thread of the screw 41 is intended to be brought to project from the side opposite to the upper side of the clamp 42. Each clamp 42 is intended to keep the head 28 and the crankcase 11 in contact by bringing a part of the clamp 42 into abutment on the head 28 and another part of the clamp 42 into abutment on the crankcase 11. After the screw 41 has been inserted, the head 48 of the screw 41 is intended to be brought into abutment on the clamp 42. The thread of the screw 41 is arranged to be screwed into a thread produced in a flange 44 of the crankcase 11. The clamp 42 contains a shoulder 45 intended to engage with the shoulder 40 of the head 28 so that, after tightening of the screw 41, the head 28 is kept in close contact with the cooler 4. Preferably, the shoulder 46 can be arranged so as to only be in contact with the cooler 4, not with the crankcase 11. The shoulder 45 contains a recess 396 intended to reduce the heat conduction between the clamp 42, and consequently the crankcase 11, and the head 28. Also, the shoulder 45 of the clamp 42 can thus be defined as consisting of an edge 46 extending in the direction connecting the expansion zone 15 to the compression zone 14 and forming the single part of the clamp 42 intended to come into contact with the head 28, and in particular into contact with the shoulder 40 of the head 28. This edge 46 is situated on the side of the clamp 42 opposite the motor 1. This edge 46 is intended to minimize the contact zone between the clamp 42 and the head 28. Similarly, the face of the clamp 42 situated facing the flange 44 of the crankcase 11, contains an edge 47 intended to abut against the flange 44. This edge 47 extending in the direction connecting the expansion zone 15 to the compression zone 14 and being brought into contact with the flange 44. This edge 47 is situated on the outer side of the clamp 42 with respect to the centre of the machine 1. This edge 47 forms the only part of the clamp 42 intended to come into contact with the crankcase 11. This edge 47 is intended to reduce the contact zones between the clamp 42 and the crankcase 11 by keeping a space between the clamp 42 and the crankcase 11.

According to the invention, the reduction in the heat conduction between the hot 2 and cold 3 parts that are at different temperatures was carried out by implementing characteristics, and/or by their combinations, which are:

using a single liner 8 situated entirely in the cold part 3 of the motor 1, and/or providing the cooler 4 in direct contact with the single liner 8, and/or maximizing the surfaces of contact between the cooler 4 and the single liner 8, and/or providing the regenerator 24 entirely in the head 28 and thus entirely in the hot part 2, and/or minimizing the surfaces of contact between the head 28 and the cold part 3, and/or introducing recesses in the contact zones between the head 28 and the cold part 3, and/or reducing the size of the walls 33, 34 of the head 28, and/or reducing the size of the wall of the liner 8, which is made possible by using a single liner 8 entirely comprised in the cold part 3 of the motor 1.

According to the invention, the reduction in the dead spaces was carried out by implementing characteristics, and/or by their combinations, which are:

using a single liner 8 situated entirely in the cold part 3 of the motor 1, and providing passage ducts 13 at the level of the compression zone 14, and reducing the thickness of the passage ducts 13, and/or reducing the distance separating the ends-of-stroke of the displacer 6 and power 7 pistons at the level of the compression zone 14.

According to the invention, the reduction in the friction losses during flow of the gases was carried out by implementing characteristics, and/or by their combinations, which are:

using a regenerator 4 comprising volumes with different successive porosities along the direction of flow of the gas, and/or using a regenerator comprising alternate portions with high and low porosity so as to increase the overall hydraulic diameter of the regenerator 4 so as to reduce the overall friction losses, while preserving an equivalent exchange surface, and/or using a regenerator 4 in which the porosity values at the ends of the regenerator 4, and in particular on the side of the hot heat exchanger 5, are lower than the porosity values in the centre of the regenerator 4, and/or the porosities of the portions of the regenerator 24 increase from a central plane of the regenerator to the ends of the regenerator 24, and/or the portion of the regenerator with the highest porosity has a porosity equal to 1, and/or the porosity is comprised between 0 and 1 per unit of volume and/or between 0 and 1 per unit of length, and/or the regenerator 24 is produced from a rigid porous material being composed of an assembly of contiguous cells arranged spatially relative to one another, the or each of the surfaces of contact of each of the cells with the gas forming an angle comprised between 5° and 85° with respect to the direction of flow of the gases, and/or each cell of the regenerator 24 comprises at least four oblong elements extending from the centre of the cell, each of the elements forming an angle comprised between 5° and 85° with respect to the direction of flow of the gases, and/or two contiguous cells of the regenerator 24 are physically connected together:

by at least one of their oblong elements, or by a layer of material to which at least one of their oblong elements is connected, and/or the oblong elements of the cells of the regenerator 24 are symmetrical in twos with respect to one or more planes of symmetry comprising the centre of the cell.

Of course, the invention is not limited to the examples that have just been described, and numerous adjustments can be made to these examples without departing from the scope of the invention.

In addition, the different characteristics, forms, variants and embodiments of the invention can be combined with one another in various combinations unless they are incompatible or mutually exclusive.

The invention claimed is:

1. A beta-type Stirling machine operating in refrigerating mode, said Stirling machine comprising:

a cold part and a hot part;

a displacer piston comprising a friction zone;

a power piston comprising a friction zone; and a single liner positioned in the hot part of the Stirling machine operating in refrigerating mode, in which single liner the friction zones of the displacer piston and of the power piston slide, the single liner comprises passage ducts of a gas moving from a compression space volume of the Stirling machine operating in refrigerating mode, to a cooler of the Stirling machine operating in refrigerating mode, or vice versa, said passage ducts passing through the single liner.

2. The Stirling machine according to claim 1, in which the single liner extends along the strokes of the friction zones of the displacer piston and of the power piston.

3. The Stirling machine according to claim 1, in which the single liner extends from a lower end-of-stroke of the friction zone of the power piston, called crankcase end of the single liner, said lower end-of-stroke of the friction zone of the power piston being situated on the side of a crankshaft of the power piston, up to an upper end-of-stroke of the friction zone of the displacer piston, called separation end of the single liner, said upper end-of-stroke of the friction zone of the displacer piston being situated on the side of a heat exchanger.

4. The Stirling machine according to claim 1, in which the cooler of the Stirling machine operating in refrigerating mode, is at least partially in direct contact with the single liner and surrounds at least partially the single liner, said cooler of the Stirling machine operating in refrigerating mode being entirely comprised within the hot part of the Stirling machine operating in refrigerating mode.

5. The Stirling machine according to claim 1, in which the single liner and the cooler of the Stirling machine operating in refrigerating mode are inserted at least partially into a crankcase until being brought into abutment against shoulders of the crankcase.

6. The Stirling machine according to claim 1, comprising a head forming at least partially the cold part of the Stirling machine operating in refrigerating mode, at least a part of one end of said head, called separation end of the head, is partially in abutment on the separation end of the single liner and partially in abutment on a part of the cooler of the Stirling machine operating in refrigerating mode, called separation end of the cooler of the Stirling machine operating in refrigerating machine mode.

7. The Stirling machine according to claim 6, comprising a regenerator extending from the separation end of the head to one or more terminal parts, called regenerator terminal parts, of one or more passage channels of a gas moving from the expansion space volume of the Stirling machine operating in refrigerating mode, to the regenerator, or vice versa.

8. The Stirling machine according to claim 7, in which the regenerator is gripped between two walls of the head, one of said walls of the head, called inner wall of the regenerator, forming a part of an inner wall of the cold part of the Stirling machine operating in refrigerating mode, the other one of said walls of the head, called outer wall of the regenerator, forming a part of an outer wall of the cold part of the Stirling machine operating in refrigerating mode.

9. The Stirling machine according to claim 8, in which a part of the outer wall of the regenerator is in abutment on the separation end of the cooler of the Stirling machine operating in refrigerating mode, and a part of the inner wall of the regenerator is in abutment on the separation end of the single liner.

10. The Stirling machine according to claim 6, in which one or more recesses are produced in:

one or more parts of the separation end of the single liner in abutment on the separation end of the head and/or one or more parts of the separation end of the cooler of the Stirling machine operating in refrigerating mode in abutment on the separation end of the head, and/or one or more parts of the separation end of the head in abutment on the separation end of the single liner and/or in abutment on the separation end of the cooler of the Stirling machine operating in refrigerating mode.

11. The Stirling machine according to claim 8, comprising an assembly system arranged to keep the head and the crankcase in contact; the assembly system is connected to the crankcase and is arranged to engage with a shoulder of the head situated at the level of the separation end of the outer wall of the head being in abutment on the separation end of the cooler of the Stirling machine operating in refrigerating mode.

12. The Stirling machine according to claim 7, in which a maximum hydraulic diameter of each of the flow routes of the cooler of the Stirling machine operating in refrigerating mode and of the passage channels of the head are greater than or equal to a thickness of a thermal boundary layer.

13. The Stirling machine according to claim 1, in which one or more friction means of the displacer piston and/or one or more friction means of the power piston comprise graphite and/or polytetrafluoroethylene.

14. The Stirling machine according to claim 1, in which the single liner is made from steel.

15. A beta-type Stirling machine operating in refrigerating mode, said Stirling machine comprising:

a cold part and a hot part;

a displacer piston comprising a friction zone;

a power piston comprising a friction zone; and a single liner positioned in the hot part of the Stirling machine operating in refrigerating mode, in which single liner the friction zones of the displacer piston and of the power piston slide, the single liner extends from a lower end-of-stroke of the friction zone of the power piston, called crankcase end of the single liner, said lower end-of-stroke of the friction zone of the power piston being situated on the side of a crankshaft of the power piston, up to an upper end-of-stroke of the friction zone of the displacer piston, called separation end of the single liner, said upper end-of-stroke of the friction zone of the displacer piston being situated on the side of a heat exchanger.

* * * * *